United States Patent [19]

Hulsey

[11] 4,017,116
[45] Apr. 12, 1977

[54] RECREATION VEHICLE

[76] Inventor: William J. Hulsey, 114 Columbia, Oak Ridge, Tenn. 37830

[22] Filed: Aug. 11, 1975

[21] Appl. No.: 603,514

[52] U.S. Cl. .................................. 296/26; 52/66
[51] Int. Cl.² ....................................... B62D 33/08
[58] Field of Search .............. 296/23 R, 23 C, 26, 296/27; 52/66, 67

[56] References Cited

UNITED STATES PATENTS

| | | | |
|---|---|---|---|
| 3,106,750 | 10/1963 | Jarman | 296/26 |
| 3,441,101 | 4/1969 | Parnell | 296/23 R |
| 3,740,088 | 6/1973 | Ratcliff | 296/23 C |
| 3,823,974 | 7/1974 | Patnode | 296/27 |
| 3,897,100 | 7/1975 | Gardner | 296/23 R |

Primary Examiner—Joseph F. Peters
Assistant Examiner—John A. Carroll

[57] ABSTRACT

A self-contained convertible recreational vehicle or travel trailer including an open-top box type body section provided with rigid forward and aft cover sections which are movable between collapsed and extended positions with respect to the body section and which provide a roof for the body section both when the cover sections are collapsed for towing of the trailer and when they are extended to open the trailer for camping. Torsion bar means assist in moving the forward and aft cover sections between their collapsed and extended positions. In one embodiment, spring biased sliding beds mounted at opposite ends of the body portion adjacent the top of the end walls thereof, extend to an outward position in engaging relationship with the lower margins of the opposed end walls of each of the forward and aft sections to assist in moving the cover sections between their collapsed and extended positions. Cooperating upper and lower door sections provided on one side of the trailer selectively open and close registering openings in the side walls of the body section and the aft section. In one embodiment, the interior of the trailer includes storage and kitchen accommodations, plus a toilet and a collapsible shower.

9 Claims, 13 Drawing Figures

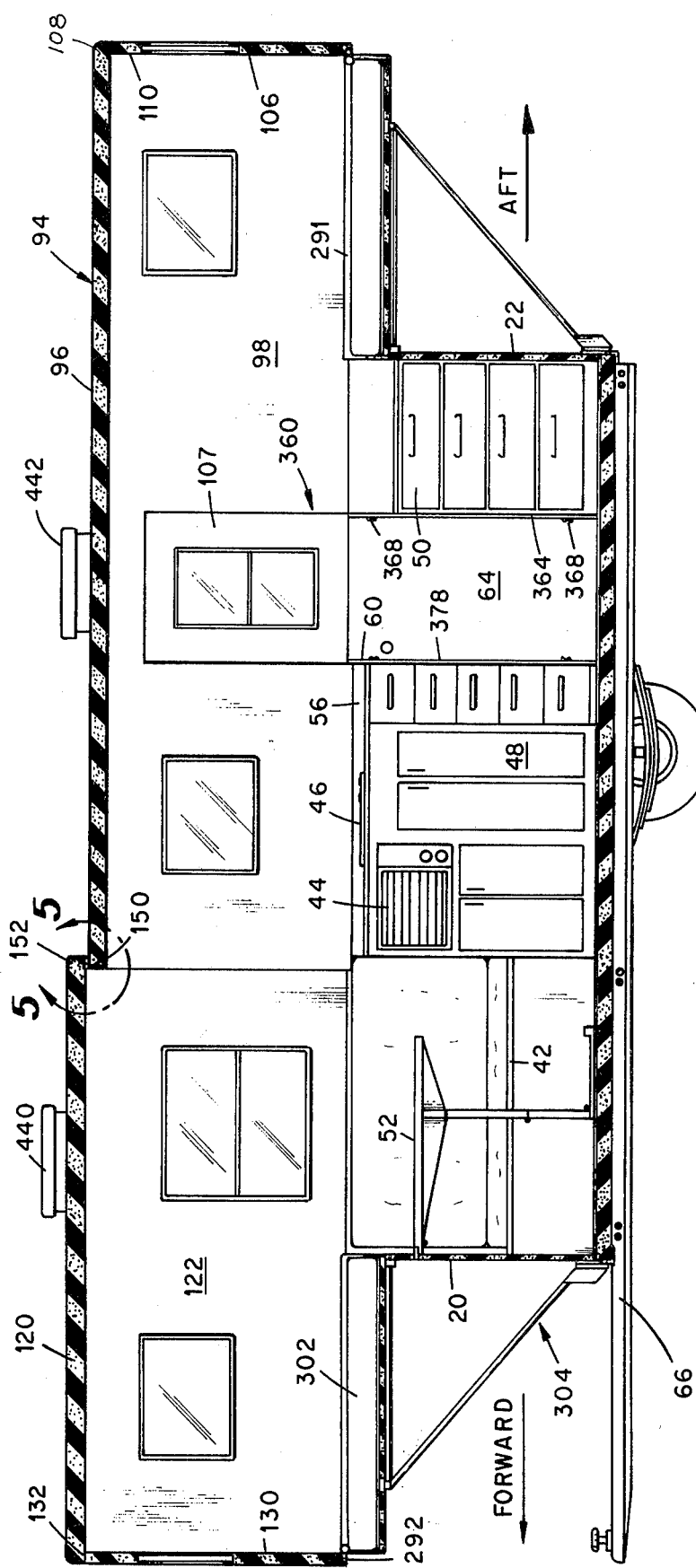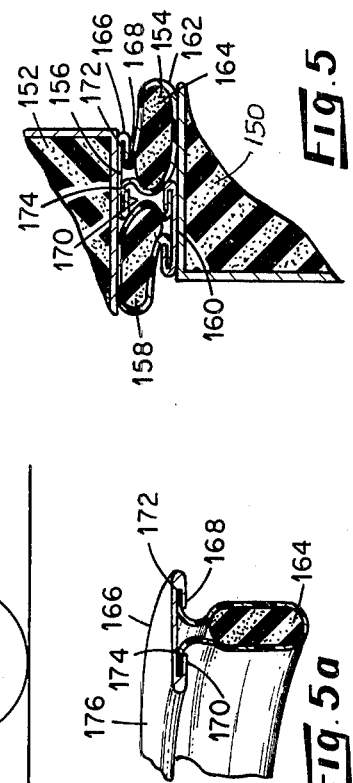

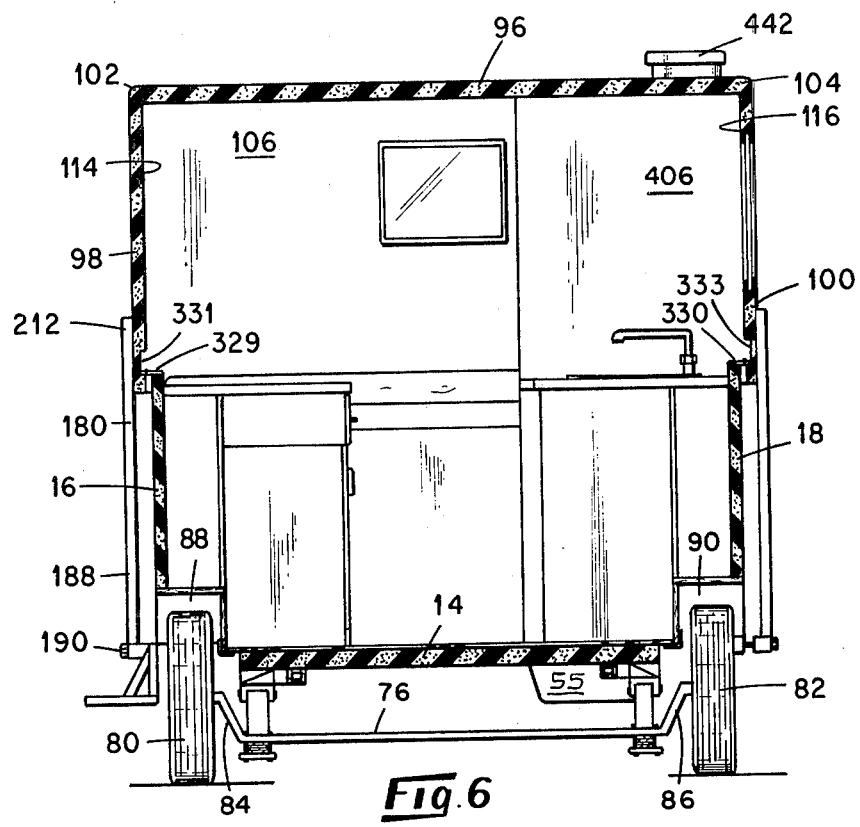
Fig.6
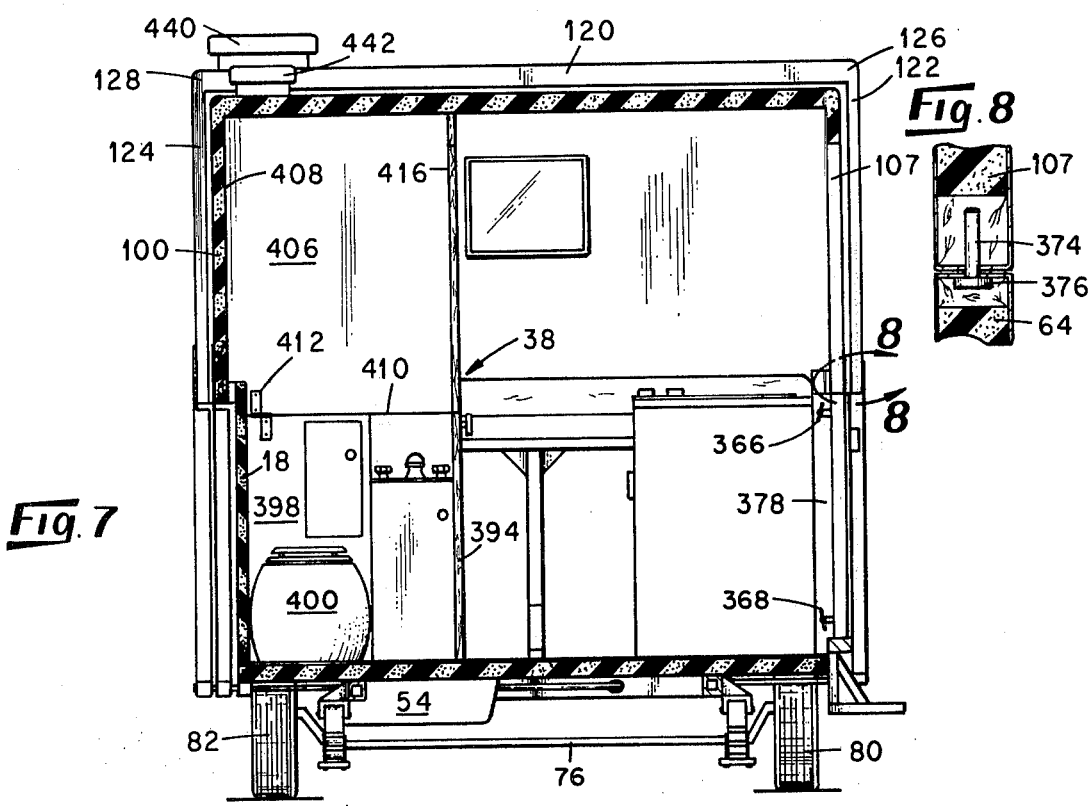
Fig.7
Fig.8

RECREATION VEHICLE

This invention relates to recreational vehicles or camping trailers and in particular to those camping trailers that are convertible in size.

In the interest of ease of towing and gas economy, it is desirable that a travel trailer, when towed behind a motor vehicle, exhibit a minimum profile, hence minimum resistance to air flow. In a similar manner, the lateral surface area of a travel trailer is desirably kept at a minimum to reduce side thrust forces that at times result in sway problems of a magnitude sufficient to result in loss of control over the vehicle and trailer.

Further, it is desired in a camping trailer that there be provided a maximum of the conventional kitchen comforts such as a stove, refrigerator, numerous cabinets and storage space, etc. In addition, there is desired a maximum of sleeping room, consistant with minimizing the size of the trailer to enhance its mobility.

Heretofore, travel trailers have included "fixed-size" travel trailers, that is, travel trailers that are not convertible in size. Because these fixed sized trailers present problems in towing, it has been proposed to provide a travel trailer that folds down during transit, but which can readily be opened for camping. In general, these trailers have included canvas top fold-out units, and combinations of a hard top with canvas fold-out units. In one relatively recently introduced travel trailer, the fold-out side walls are of a rigid material. Each of these prior art devices presents its own set of problems, many of which relate to the set-up and knock-down of the unit and to its ability to expel the elements.

It is an object of the present invention to provide a travel trailer having a rigid body which is convertible as to its size. Other objects and advantages of the invention will be recognized from the following description, including the drawings in which:

FIG. 4a is a sectional view taken along the approximate longitudinal vertical midplane of the trailer shown in FIG. 1 and showing the left hand side of the trailer;

FIG. 5 is a fragmentary sectional view of a seal means taken generally along the line 5—5 of FIG. 4;

FIG. 5a is a fragmentary view of a seal means;

FIG. 6 is a transverse sectional view taken along the line 6—6 of FIG. 1;

FIG. 7 is a transverse sectional view taken along line 7—7 of FIG. 1;

FIG. 8 is a fragmentary sectional view of a door connection means taken generally along the line 8—8 of FIG. 7;

In accordance with the present disclosure, there is provided a convertible travel trailer including an open-top box type body section provided with rigid forward and aft cover sections which are movable between collapsed and extended positions with respect to the body section and which provide a roof for the body section both when the cover sections are collapsed for towing of the trailer and when they are extended to open the trailer for camping. Torsion bar means assist in moving the forward and aft cover sections between their collapsed and extended positions. In one embodiment, spring biased sliding beds mounted at opposite ends of the body portion adjacent the top of the end walls thereof, extend to an outward position in engaging relationship with the lower margins of the opposed end walls of each of the forward and aft sections to assist in moving the cover sections between their collapsed and extended positions. Cooperating upper and lower door sections provided on one side of the trailer selectively open and close registering openings in the side walls of the body section and the aft section. The interior of the trailer includes storage and kitchen accommodations, plus toilet and a collapsible shower.

Figure 4:
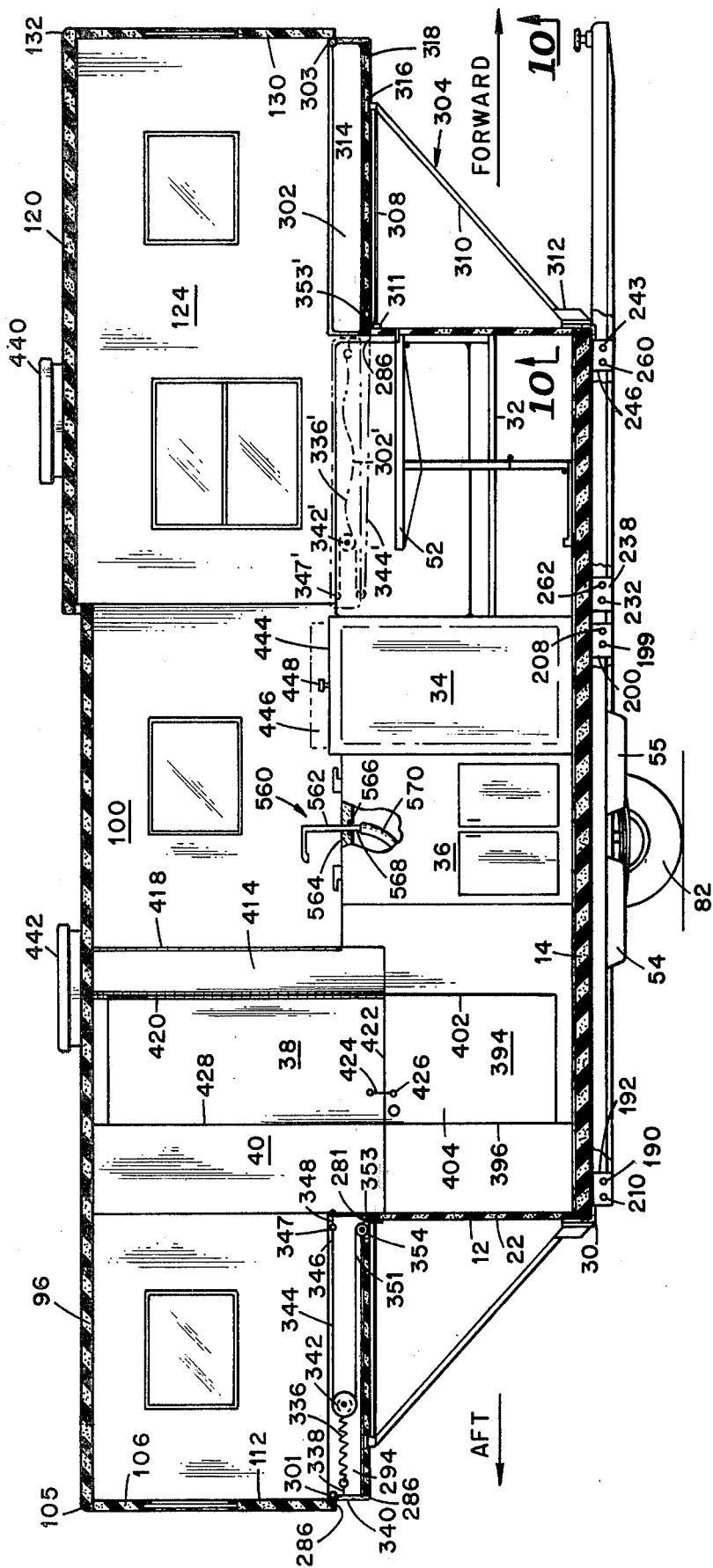
FIG. 4 is a sectional view taken along the approximate longitudinal vertical midplane of the travel trailer shown in FIG. 1 and showing the right hand side of the trailer.

The illustrated trailer 10 includes a generally open-top box type body section 12 having a floor 14 disposed in a substantially horizontal plane, and upstanding opposite rectangular side walls 16 and 18, and upstanding opposite rectangular end walls 20 and 22, the side walls and end walls joined to the floor along its peripheral edges and being joined at the corners 24, 26, 28 and 30 to complete the open-top box type structure of the body section. Various fixtures commonly found in camping trailers are supported on the floor 14 within the open space defined by the side and end walls. Referring to FIGS. 4 and 4a, in the illustrated embodiment the floor supports, along the side wall 18, a first bench 32, a refrigerator 34, a sink 36, a shower stall 38 and a pivoted clothes closet 40. Along the opposite side wall 16, there is provided a second bench 42, an air conditioner 44, a stove 46, a first storage cabinet 48 and a second storage cabinet 50. A knock-down table 52 is mounted on the end wall 20 between the benches 32 and 42. Appropriate openings through the floor accommodate conventional plumbing, etc. A holding tank 54 and a waste water tank 55 are mounted on the bottom side of the floor 14.

Figure 1:
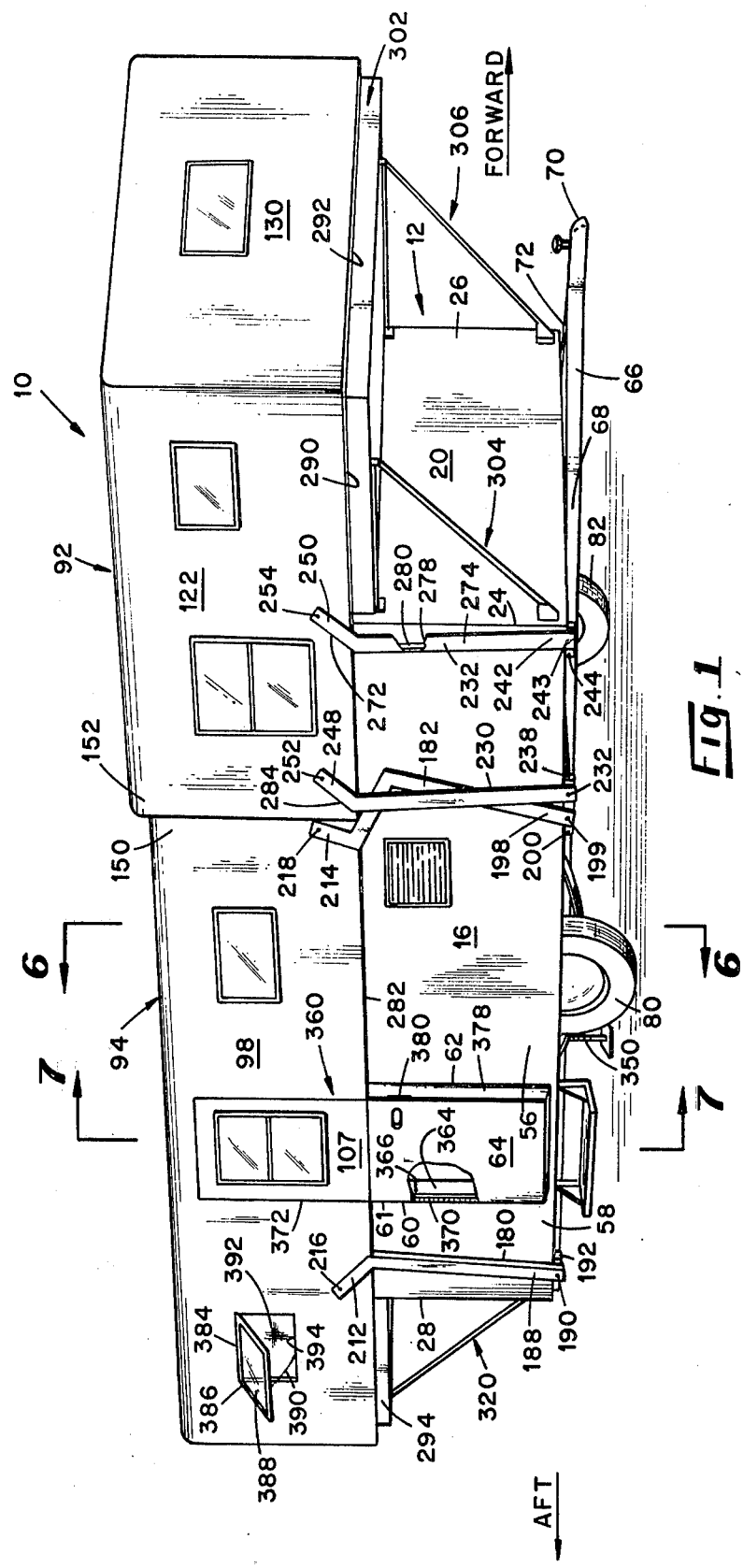
FIG. 1 is a representation of a travel trailer expanded for camping and embodying various features of the invention.

As shown in FIG. 1, the side wall 16 of the body section, is divided into spaced apart sections 56 and 58 having upright edges 60 and 62 that define an opening proportioned to receive a door section 64, which will be described in more detail hereinafter. The height of the side walls 16 and 18, in one embodiment, are chosen to be about 38 inches which permits utilization of conventional appliances, such as a refrigerator, thereby eliminating the inconvenience of an ice chest or the expense of a custom-built refrigerator. in a preferred embodiment, the floor is approximately seven feet wide and about thirteen feet long.

As depicted, the floor 14 is supported on a V-frame 66 comprising a first beam 68 that extends generally diagonally from one of the aft corners 28 of the floor forwardly to a hitch 70 of the trailer and a further beam 72 that extends from the opposite aft corner 30 of the floor forwardly to the hitch point 70. An axle 76 is mounted transversely of the beams 68 and 72 is substantial alignment with the transverse midplane of the body section as by U-bolts 78 or the like. Wheels 80 and 82 mounted on the opposite ends 84 and 86 of the axle 76 provide frictional engagement between the trailer and a supporting surface such as a roadway. in the preferred embodiment, the body section 12 is provided with recessed wheel openings 88 and 90 to permit the floor 14 to be supported above the roadway by a minimal distance.

As will be recognized, the body section of the trailer serves as living quarters while camping. To complete the living quarters, the body section 12 of the trailer is provided with forward and aft cover sections 92 and 94 that are independently mounted on the body section such that the two roof sections can be moved along arcuate paths between extended and collapsed positions. In their collapsed positions, the cover sections nest with each other and with the body section to reduce the size of the trailer for towing. In their extended positions, the two cover sections, in cooperation with the body section, and sliding beds as will appear more fully hereinafter, define substantially sized living quarters.

Figure 3:
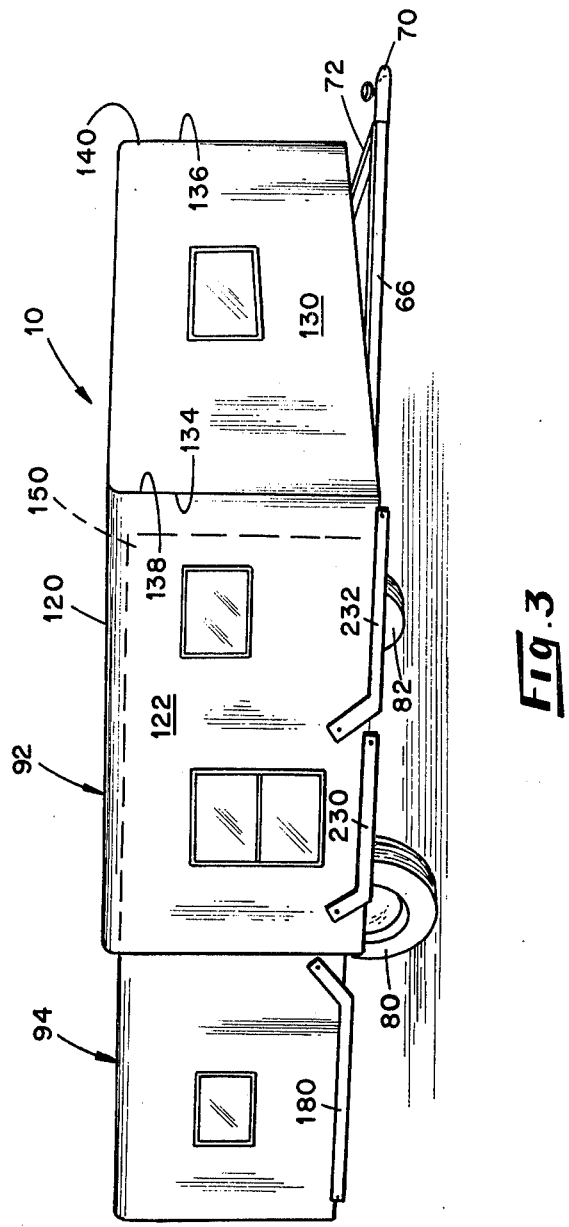
FIG. 3 is a representation of the travel trailer of FIG. 1 collapsed for towing.
Figure 9:
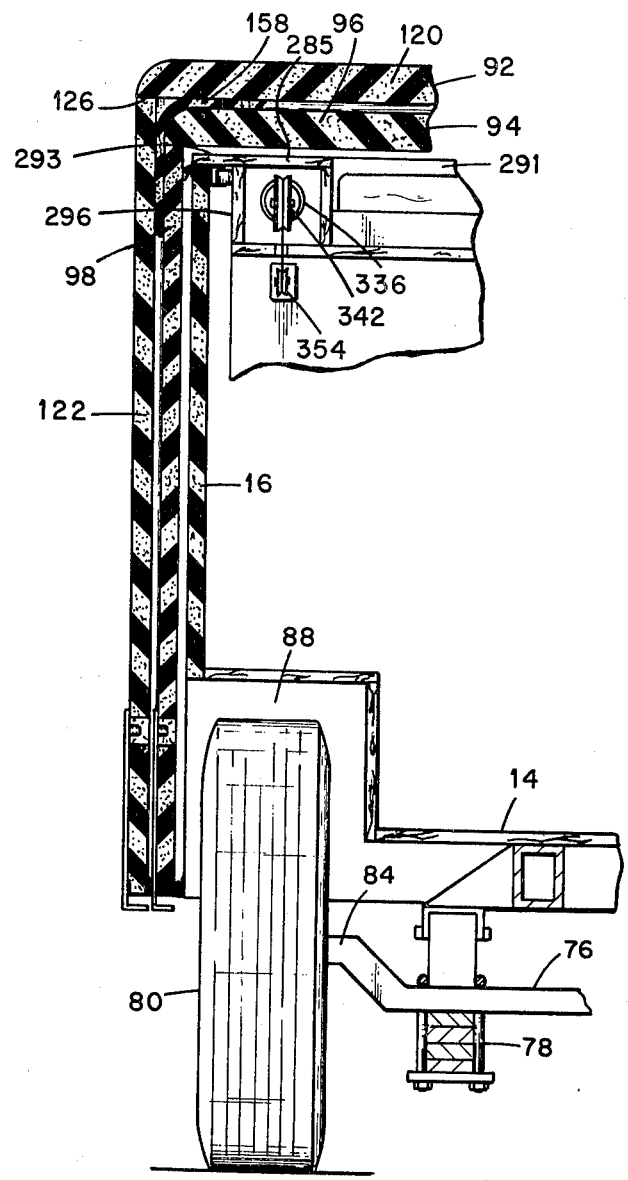
FIG. 9 is a fragmentary sectional view of the trailer as collapsed for towing and showing various features of the invention.

To this end, as shown in the several FIGS. and specifically to FIGS. 6, 7, and 9, and aft cover section 94 comprises a generally planar and rectangular roof 96 having side walls 98 and 100 depending from opposite side margins 102 and 104 of the roof and a rear end wall 106 depending from the rear edge 108 of the roof 96. The upright side edges 110 and 112 of the walls 98 and 100 are joined to the side edges 114 and 116 of the end wall 106 to define a three-sided cover section 94 for the aft portion of the body section. The lateral dimension between the interior surfaces of the side walls 98 and 100 is chosen to be sufficiently great to receive therebetween the aft portions of the side walls 16 and 18 of the body section so that the aft end of the body section is received in nesting relationship within the aft cover section when the aft cover section is in its collapsed position as depicted in FIGS. 3 and 9. As will be noted, the aft cover section does not include a forward end wall so that it its collapsed position the aft cover section nests snugly over the aft end of the body section with the rear end wall 106 of the cover section disposed adjacent to and substantially parallel with the rear end wall 22 of the body section.

Further, the side walls 16 and 18 of the aft cover section are disposed adjacent to and substantially parallel with the side walls 98 and 100 of the body section. In the depicted embodiment, the height of the side and end walls 98, 100 and 106, respectively, of the aft cover section is chosen to be substantially equal to the height of the side walls 16 and 18 of the body portion. By this means, the cover section, when extended, is raised to a height suitable to accommodte an adult standing on the floor of the body section. When collapsed, the length and the depth of the aft cover section (as established by the height of its side walls 98 and 100) are such that substantially the whole of the body section nests fully within the cover section to thereby minimize the profile of the trailer as respects the body section and the aft cover section.

Referring to FIG. 1, the side wall 98 of the aft cover section is provided with a rectangular opening fitted with a door section 107 hingedly mounted in such opening.

The trailer 10 further includes a forward cover section 92, comprising a generally planar roof 120 disposed in a substantially horizontal plane, and having generally planar opposite side walls 122 and 124 depending from each of the opposite side margins 126 and 128 thereof and a forward wall 130 depending from the forward edge 132 of the roof 120. The upright side edges 134 and 136 of the side walls 122 and 124, respectively, are joined to the opposite side edges 138 and 140 of the forward wall 130 to define a three-sided cover section 92 for the forward end of the body section and the forward end of the aft cover section when the cover sections are in their collapsed positions as seen in FIG. 3. The interior surfaces of the side walls 122 and 124 of the forward section are spaced apart by a distance slightly greater than the lateral distance between the outer surfaces of the side walls 98 and 100 of the aft cover section 94 to receive therebetween the forward ends of the side walls 98 and 100 of the aft cover section. Concommitantly, the collapsed forward cover section 92 receives the forward end of the body section and the forward end of the aft cover section in nesting relationship therewith to minimize the trailer profile as respects the body section and the forward cover section.

In order to provide insulation and maintain a low trailer weight, the walls and roof of the fore and aft sections and the body section are constructed of styrofoam panels sandwiched between aluminum sheets. Additionally, it has been found that walls of this type are particularly adapted for prefabrication. Conventional electrical conductors (not shown) are disposed in the styrofoam and thereafter connected with like conductors in adjoining panels to provide electrical conductive paths to suitable outlet locations.

As depicted in FIGS. 1, 4, 4a and 5, when the forward and aft cover sections are in their extended positions, the relative lengths and positions of these two cover sections is such that the rear edge 152 of the forward cover section overlaps the forward edge 150 of the aft cover section 94. The depicted cover sections are of unequal lengths, but it will be recognized that other relative lengths, including equal lengths, of the cover sections are suitable. As seen in FIG. 5, the space between the overlapping edges 150 and 152 is sealed against the elements by seal means comprising a first strip seal 154 secured to the interior margin 156 of the rear edge 152 of the forward cover section, such seal extending along both side walls 122 and 124 and the roof 120, engages the underlying side walls 98 and 100 and roof 96 of the aft cover section in sealing relationship. Further, there is provided a second strip seal 158 secured to the forward exterior margin 160 of the aft cover section. This second seal 158 extends along the side walls 98 and 100 and the roof 96 of the aft cover section and sealably engages the interior surfaces of the side walls 122 and 124 and roof 120 of the forward cover section at a location forward of the location of the first seal 154, thereby providing a sealing arrangement between the cover sections that provides dual protection against entry of the elements into the trailer. When the forward and aft cover sections are in their collapsed positions, the seals 154 and 158 function in like manner as described above to close the space between the overlapping margins of the cover sections.

A preferred seal for closing the space between the overlapping ends of the cover sections comprises a strip of tough, wear resistant material 162, such as the plastic fabric commonly known as Naugahyde which is folded about a resilient vinyl foam core 164 of generally rectangular cross section and mounted on an aluminum strip 166 having its opposite side margins 168 and 170 crimped about opposite side margins 172 and 174 of the Naugahyde strip. Suitable adhesive deposited on the back surface 176 of the aluminum strip serves to mount the seal at a desired location with the encapsulated resilient core in position for sealing.

The forward and aft cover sections 92 and 94 are mounted on the body section 12 of the trailer for independent movement along respective generally arcuate paths between their collapsed and extended positions. In the illustrated embodiment, each of the cover sections is mounted to the body section by a set of four pivoting arms of substantially equal lengths, two arms on each of the opposite sides of a cover section. More specifically, the aft cover section 94 is mounted to the body section 12 by means of arms 180, 182, 184 and 186. One end 188 of the arm 180 is anchored to one end 189 of a torsion bar 190 that is mounted transversely of and on the underside of the body section by means of blocks 192 and 194. The end 189 of the bar 190 is rotatable within the block 192 whereas the opposite end 196 of the bar 190 is anchored in nonrotating relationship with the block 194. Thus, as the arm 180 is rotated about the longitudinal axis of the bar 190, as when the aft cover section is moved between its collapsed and extended positions, the torque of the bar 190 is changed. The end 198 of the arm 182 is similarly anchored to a further torsion bar 199 mounted in blocks 200 and 202. On the opposite side of the aft cover section, the ends 204 and 206 of the arms 184 and 186 are anchored to the ends of torsion bars 208 and 210, respectively, in like manner as the arms 180 and 182 and their respective torsion bars 190 and 199. In the instance of the bars 190 and 199, their ends are rotatably mounted in the blocks 192 and 200 with their opposite ends nonrotatably anchored in the blocks 194 and 202, respectively.

The opposite ends 212 and 214 of the arms 180 and 182 are rotatably mounted on pins 216 and 218 projecting from the side 98 of the aft cover section, and the opposite ends 220 and 222 of the arms 184 and 186, respectively, are rotatably mounted on pins 224 and 226 that project from the opposite side 100 of the aft cover section. It is noted that the arms 182 and 184 are mounted on opposite sides of the forward end 150 of the aft cover section and the arms 180 and 186 are mounted on opposite sides of the rear end of this cover section and, as noted above, these arms are of substantially equal lengths. By this means, the aft cover section is adapted to be moved along a generally arcuate path between its collapsed and extended positions in the manner of a pantographic movement.

The forward cover section 92 is similarly mounted to the body section for like pantographic movement between its collapsed and extended positions by arms 230, 232, 234 and 236. More specifically, the arm 230 is anchored in nonrotating relationship to one end of a torsion bar 232 that is mounted transversely of and on the underside of the body section by means of blocks 238 and 240, the bar 232 being rotatable within the block 238 and its opposite end being nonrotatably anchored in the block 240. On the same side of the body section, at a location approximately one-third of the distance from the end wall 20 toward the end wall 22 thereof, one end 242 of the arm 232 is mounted in like manner a torsion bar 243 disposed in blocks 244 and 246. The opposite ends 248 and 250 of the arms 230 and 232 and rotatably mounted on pins 252 and 254 that project from the side 122 of the forward cover section, the ends 256 and 258 of the arms 234 and 236 are nonrotatably anchored to the ends of torsion bars 260 and 262 that are rotatably mounted in the blocks 246 and 240 and whose opposite ends are nonrotatably anchored in the blocks 244 and 238. The opposite ends 264 and 266 of the arms 234 and 236 are rotatably mounted on pins 268 and 270 that project from the side 124 of the forward cover section. In similar manner as with the aft cover section, the arms 230, 232, 234 and 236 are of substantially equal length. The arms 230 and 236 are located adjacent the rear end of the forward cover section on opposite sides thereof. The arms 234 and 232 are located on opposite sides of this cover section at a location about halfway between its ends, thereby providing for pantographic movement of the forward cover section along a substantially arcuate path between its collapsed and extended positions.

Figure 2:
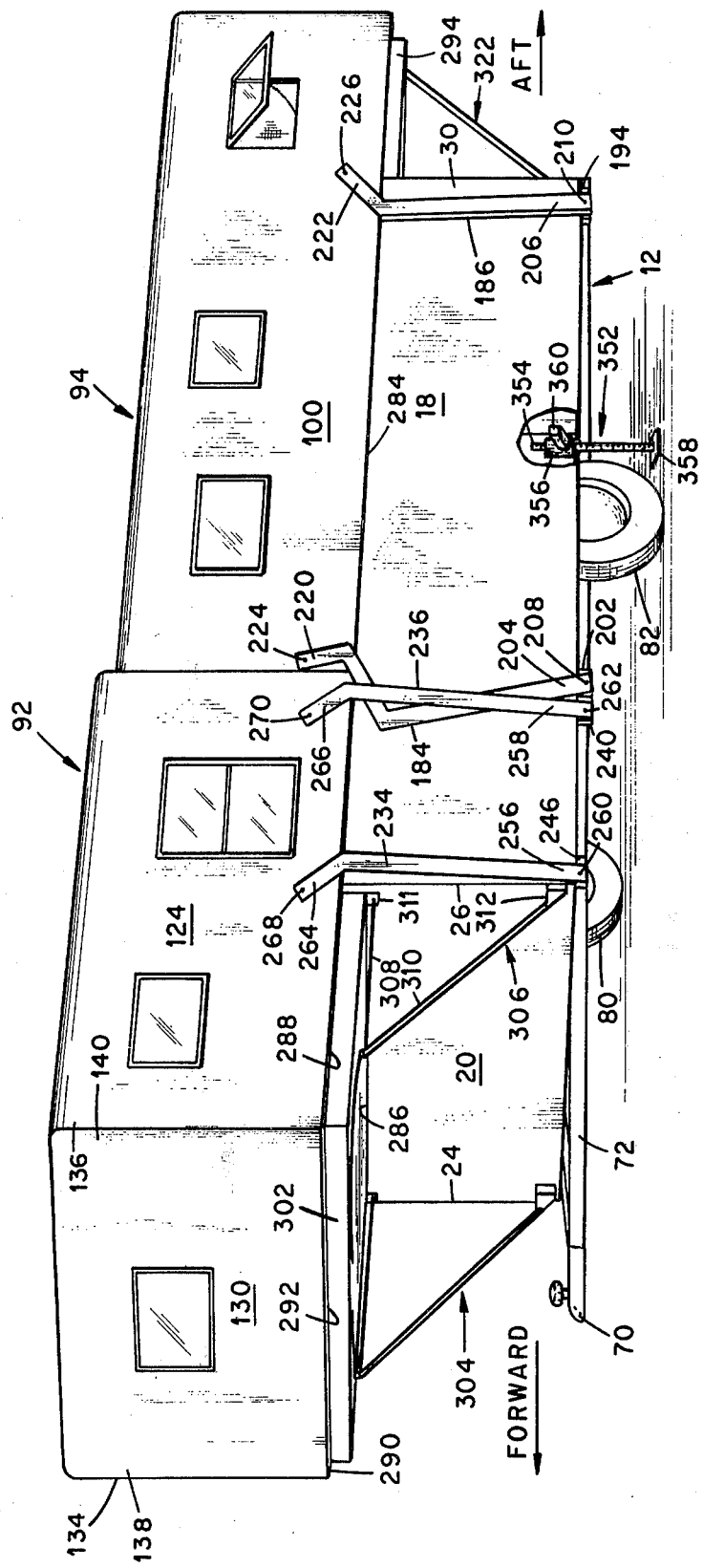
FIG. 2 is a representation of the opposite side of the trailer shown in FIG. 1.

Referring specifically to FIGS. 1 and 2, each of the arms 230 and 232 that serves in mounting the forward cover section to the body section is of a dog-legged construction including a first leg 272 that is of a rectangular cross-section and thin enough to lie between the adjacent side walls of the forward and aft cover sections when these sections are in their collapsed positions, and a second leg 274 that is integrally joined to the first leg but is of an L-shaped cross-section. One portion 278 of the second leg 274 is a continuation of the first leg 272 with these members being disposed in a plane that is substantially parallel to the side wall 92 of its respective cover section. The other portion 280 of the second leg 274 is disposed perpendicular to and extends inwardly of the side wall 122 to underlie the bottom edge 290 of the side wall 98 when the cover section is in its collapsed position. The angle of offset in the dog-legged arm construction, in one embodiment is about 40°, with the legs 272 being about 11 inches long, this being the end 250 of the arm 232 that is mounted to the aft cover section. The other leg 274 of the arm 232, is about 40 inches long, thereby establishing an effective vertical height of the aft cover section of 47 ¼ inches (distance between torsion bar 243 and pin 254), such distance being fixed. The leg lengths of the other arms 230, 234 and 236 on the forward cover section are equal to the leg lengths of the arm 232, thereby providing for pantographic movement of the forward cover section relative to the body section. Further, the equal arm lengths provide a preselected and fixed vertical height of the forward cover section above the body section when the cover section is in its extended position. By reason of the dog-legged construction of each of the arms, it is possible for a major part of the arm to be of L-shaped cross-section for strength and for a minimum length of the arm to be relatively thin to fit between the walls of the cover section and the body section, and still further for the arm to not interfere with the desired movement of the cover section. The arms 180, 182, 184, and 186 that mount the aft cover section are similarly dog-legged for like reasons. It will be recognized, therefore, that when the cover sections are fully extended, each is held at a predetermined height relative to the body section hence at a predetermined height relative to each other. In this manner, the overlapping ends 150 and 152 of the cover sections are held fixed relative to each other to provide suitable spacing therebetween for the functioning of the seals 154 and 158 as referred to above.

In the preferred embodiment, each of the torsion bars is initially set when each cover section is in its extended position. When the respective cover is moved toward its collapsed position, its arms are rotated which rotates one end of their respective torsion bars. In this manner, energy is stored in each bar as the cover sections are collapsed (moved generally downwardly with the force of gravity). This stored energy is thereafter available to assist in moving the cover section generally upwardly toward its extended position. In one embodiment, in the course of moving a cover section between its fully extending and its fully collapsed positions, each arm, hence each torsion bar, is rotated about 80°. The size and material of construction of each torsion bar is chosen such that such 80 degree rotation of the four bars per each cover section will collectively provide the energy necessary to substantially lift a cover of given weight during the initial stages of movement of the cover from its collapsed position, and will provide a decreasing amount of lift during the remaining stages of movement toward the extended position.

In one embodiment, standard 48 inches wide beds are employed. The height of the walls of each of the cover sections (the walls of the forward cover section being about 2 inches taller than the walls of the aft cover section) is such that 80° of rotation from horizontal of the arms will result in raising each section about 39 inches vertically and horizontal movement of the section of about 46½ inches.

As noted hereinbefore, each of the forward and aft cover sections is open bottomed. When each of these cover sections is in its extended position, it wll be recognized that there is an open space at each of the opposite ends of the trailer, the space at the aft end of the trailer being defined by the upper edge 281 of the rear wall 22 of the body section, the bottom edges 282 and 284 of the rear portions of the side walls 98 and 100 of the aft cover section, and the bottom edge 286 of the rear wall 106 of the aft cover section. The open space at the forward end of the trailer is defined by the upper edge 286 of the forward wall 20 of the body section, the bottom edges 288 and 290 of the forward portions of the side walls 122 and 124 of the forward cover section and the bottom edge 292 of the forward wall 130 of the forward cover section. When the cover sections are in their extended positions, the space at the forward end of the trailer is filled by a bed 302 including a tray type frame 291 that includes elongated box beams (285 in FIG. 9) and flange members 293 projecting from opposite ends 296 and 298 of the frame to slidably engage the upper edges of the side walls 16 and 18 of the body section, thereby supporting the bed on such wall edges for sliding horizontally from a storage position substantially within the body section (shown in phantom in FIG. 2), forwardly to substantially occupy the space referred to above. The open space at the aft end of the trailer is filled by bed 294 mounted in like manner as the bed 302 such that the bed may be rolled from its storage position substantially within the body section (shown in phantom in FIG. 4 for bed 302)rearwardly of the body section to fill the aforesaid space. Latch means (not shown) operable from the inside of the trailer is provided on the end walls 20 and 22 to prevent inadvertent or undesired movement of the beds 294 and 302 inwardly and to prevent tilting of the bed, such latch means also serving to prevent unplanned movement of the cover sections toward their collapsed positions.

It is noted that each of the forward bed 302 is of a length slightly less than the lateral dimension of the body section. Because of such dimensional disparity, there occurs an elongated open space between the ends of such bed and the adjacent side walls of the forward cover section when the cover section is extended and the bed is pulled out. In the depicted embodiment, each of such spaces is closed by panels 329 and 330 hingedly mounted in depression 331 and 333 in the side walls of the forward section and adapted to be swung into position covering their respective open space (see FIG. 6).

As desired, an elongated seal 332 is provided on the interior surface of the end wall 106 of the aft cover section adjacent the lower margin of the wall to be sealably engaged by the bed 294 when the cover section is extended, thereby aiding in sealing the interior of the trailer against the elements and/or insects and the like. The preferred seal is of the same type as used to seal the overlapping ends of the cover sections as described hereinbefore. In like manner, the forward wall 130 of the forward cover section 92 is provided with a seal (not visible) so that the bed sealably engages the wall 130. Further, as desired, appropriate guide rollers, such as rollers 301 and 303 may be provided to reduce the frictional engagement of the bed with the several side and end wals and/or to guide the bed as it is moved.

Figure 10:
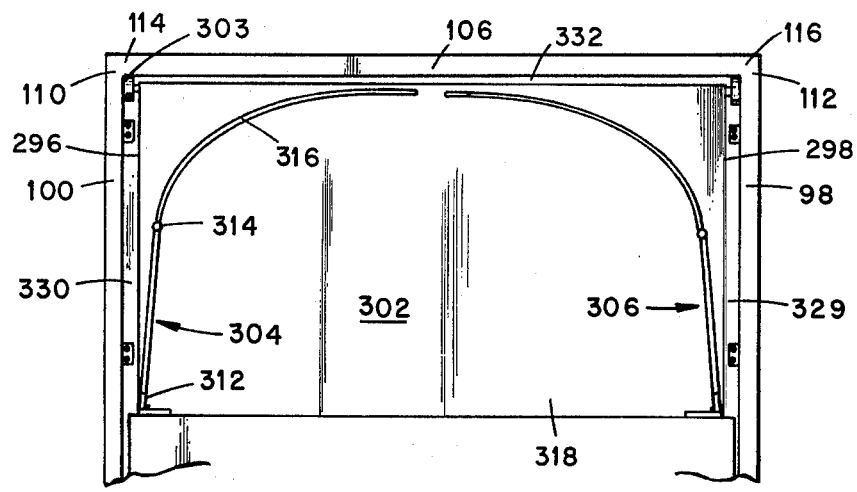
FIG. 10 is a fragmentary bottom view of a bed and taken generally along the line 10—10 of FIG. 4.
Figure 11:
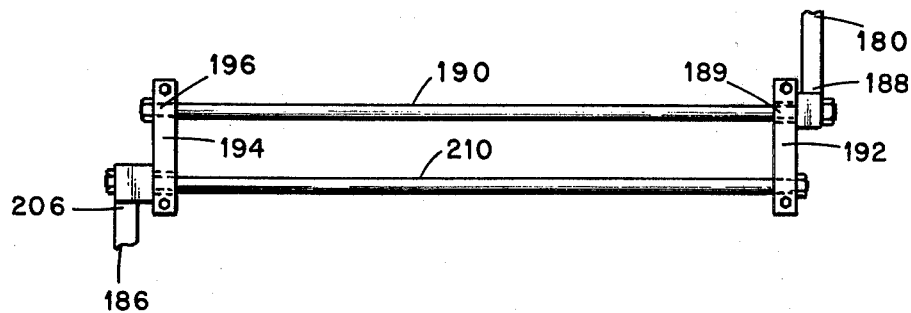
FIG. 11 is a fragmentary illustration of a torsion bar arrangement.

As seen in FIGS. 1 and 4, the forward bed 302 is provided with a set of gusset-type supports 304 and 306 each of which includes a horizontal leg 308 and a diagonal leg 310 that are hingedly mounted at 311 and 312 on the exterior surface of the forward wall 20 of the body section. The outboard end of the legs 308 and 310 are joined and provided with a pin 314 (FIG. 10) that projects upwardly from the support to engage an ellipitical groove 316 in the bottom 318 of the bed 302. Thus, as the bed is rolled out, the pin 314 follows the groove 316 to cause the support 304 to swing out to its position of support for the bed. In a reverse manner, the pin follows the groove as the bed is rolled toward its storage position to swing the support 304 to a storage position in a plane adjacent to and substantially parallel to the forward wall 20. The other support 306 for the forward bed 302 functions in the same manner as the support 304. In like manner, the aft bed 294 is supported by supports 320 and 322 (see FIGS. 3 and 10). By design, when the cover sections are in their collapsed positions, there is provided a space about 1 inch thickness between the end walls of the cover sections and their respective adjacent end walls of the body section. These spaces serve as storage compartments for the supports at each end of the body section.

As noted above, the several torsion bars provide lift assistance when the cover sections are being moved toward their extended positions, such assistance being of a decreasing amount. To more nearly balance the forces acting upon each cover section due to its weight, etc., it has been found desirable to provide additional lift assistance toward lifting of a cover section during at least the intermediate stages of its movement toward its extended position. To further such further assistance, there is provided a set of spring means mounted in the box beam at each end of the beds 294 and 302 such as causes the beds to exert a horizontally aligned force upon the end walls 106 and 130 of the cover sections as the cover sections are extended. The illustrated spring means each comprise a tension spring 336 having one end 338 thereof secured to the outboard side 340 of the bed 294 and extending therefrom along the length of each box beam of the bed. The opposite end of this spring 336 is provided with a floating pulley 342 about which a cable 344 or the like is trained. One end 346 of the cable is anchored to the inboard side 348 of the bed at 347. The opposite end 351 of the cable is trained about a further pulley 354 mounted in the inboard end of the box beam and anchored to the exterior surface of the bed wall 22 of the body section at 353. When the aft cover section 94 is in its extended position, the tension spring 336 is substantially relaxed thereby exerting minimal forces at the opposite ends 346 and 352 of the cable. As may be seen from FIG. 4, the outboard end 340 of the bed 294 is engaged by the bottom edge 286 of the forward wall 106 of the aft cover section 94 so that as this cover section is moved toward its collapsed position, the bed 294 is urged inwardly of the body section toward its storage position. The storage position of the beds is illustrated in phantom in FIG. 4 using bed 302 for clarity purposes and using prime numbers to identify and correlate the individual members. As the bed is moved inwardly, the end 346 of the cable 344 moves with the bed to stretch the spring 336 and store energy therein. When the bed is in its storage position, the stretched spring 336 exerts an outward force on the bed, hence a force against the cover section that is in a direction that provides lift to the cover section that assists in moving the cover section from its collapsed position toward its extended position. As noted, there are provided like spring means (not shown) on each end of each of the forward and aft beds so that both the forward and aft cover sections are provided with lift assistance that supplements the lift provided by the torsion bars.

To assist in stabilizing the trailer when it is parked, jack means 350 and 352 is provided on opposite sides of the floor 12 at a location adjacent, but rearwardy of, the wheels 80 and 82. Each jack means includes a leg member 354 received in a housing 356 secured to the trailer floor and a foot 358 secured on the leg 354 at the outboard end to engage a supporting surface when the leg 354 is extended. A lever arm 360 pivotally mounted on the housing 356 serves to raise, lower and lock the leg 354 in a manner similar to the common bumper jack for automobiles. Additional jacks or other stabilizing means is provided at each of the four corners of the trailer as desired.

To gain entrance to the trailer when the cover sections are extended, there is provided a door 360 comprising an upper section 107 hingedly mounted in the side wall 98 of the aft cover section as noted before. The side wall 98 of the aft section is displaced laterally outward of the side wall of the body section, however, so that to accommodate such offsetrelationshi of offset relationship side wall 16 of the body section and the side wall 98 of the aft cover section, there is provided a lower door section 64 hingedly mounted along one of its sides 61 to a panel 346 mounted on the side wall 98 of the body section for sliding lateral adjustment, as by thumb screws 366 and 368 or the like. For use when the aft cover section is extended, the panel 346 is adjusted laterally outwardly to vertically align the hinge 370 of the lower door section 64 with the hinge 372 of the upper door section 107. The two aligned door sections are connected to one another to operate as a unit as by means of a pin 374 provided on and depending from the upper door section that engages a cooperating slot 376 in the lower door section. A further and like laterally adjustable panel 378 is provided on the opposite side 60 of the door opening in the body section to function as a continuation of the door opening in the aft cover section and receive a door latch 380. During towing, the panels 364 and 378 are adjusted inwardly to position the lower door section flush with the side wall 16 of the body section.

As shown in the FIGS, a plurality of windows 384, for example, are provided at spaced apart locations along the side walls of the forward and aft cover sections. It is important that these windows not protrude beyond the flat surfaces of the side walls so that the forward and aft cover sections can readily be collapsed. To this end, each of the windows 384 includes substantially thin frame member 386 in which there is mounted a pane 388. Each frame 386 is hingedly mounted along its upper edge to its respective side wall and is spring-biased in the outwardly direction. Chain means 390, operable from the inside of the trailer in the illustrated embodiment, serves to maintain the window closed. In one embodiment, screen 392 is provided for each of the windows, each screen being mounted fully within the window opening 394.

The illustrated trailer is provided with a collapsible shower stall 38 having a lower section comprising upstanding panels 394, 396 and 398 which are joined to and cooperate with the interior surface of the side wall 18 of the body section to enclose a commode 400 and define the lower part of the shower stall. The panel 394 of such lower section is hingedly mounted at 402 to serve as a door portion 404.

To complete the stall and provide for collapsing of the cover sections, there is provided a folding upper section which cooperates with the lower section to define the substantially water impervious shower stall. This upper section includes a substantially planar side panel 406 having an edge 408 which frictionally engages the inner surface of the side wall 100 and extends perpendicularly therefrom. The bottom edge 410 of this side panel 406 is hingedly mounted at 412 along the upper edge of the lower side panel 398 and serves as a continuation thereof to complete this side of the stall. A front panel 414, including the upper door section 38 is secured to the upper side panel 406 along its upright edge 416 by a hinge 418 to define the upper front of the stall. This front panel 414, with its door section 38 is foldable against the side panel 406 and the two parallel panels are then foldable downward, via the hinge 412, to permit storage of these two panels in a horizontal position. The upper door section 38 is hinged at 420 in the upper front panel 414 and joined at its bottom edge 422 with the upper edge of the lower door section 394 as by means of a hook 424 which engages a pin 426 thereby permitting the door sections to function as a unit. In the depicted embodiment, the upper section of the shower stall is completed by a side wall 428 defined by one wall of the wardrobe 40 pivotaly mounted at one of its lower corners such that raising the wardrobe positions its wall 428 in closing relationship with the remaining walls of the upper section of the stall.

With the cover sections in their respective collapsed positions, the trailer profile is reduced substantially to facilitate towing through reduction of the trailer surface area exposed to cross the head winds. To expand the trailer for camping, the operator applies a vertical and outward lifting force on the lower margin of the end wall of the forward cover section thereby moving this cover section from its collapsed to its extended position. As noted, the torsion bars assist in this movement by exerting a rotational force on the supporting arms tending to move the supporting arms from their collapsed positions along the lower edges of the opposite side margins of the forward cover section to their substantialy upright positions when the cover section is extended.

In like manner, the aft cover section is moved from its collapsed to its extended position by the operator exerting an upward and outward force on the lower margin of the end wall of the aft cover section. Assistance in moving the aft section from its collapsed position is provided by its associated torsion bars. To further assist in this movement of the forward and aft cover sections from their collapsed to their extended positions, the spring means associated with the bed mounts exert an outward force on the end walls of the forward and aft cover sections.

When it is desired to again return the cover sections to their collapsed positions, the operator first applies an inward and downward force on the end wall of the aft cover section thereby moving the supporting arms of this section in unison from their substantially upright position to their substantially horizontal positions. The operator next applies an inward and downward force on the end wall of the forward cover section thereby moving the supporting arms of this cover section in unison from their substantially upright position to their substantially horizontal positions.

In view of the foregoing disclosure, it will be apparent to one skilled in the art that the movements of the cover sections may be accomplished by electric motor means in any of several ways. For example, the motor may be drivingly connected with a lead nut and screw arrangement, or to a rack and pinion arrangement, or connected through an appropriate gear system to the arms that mount the cover sections, to move the cover sections relative to the body section. In one embodiment, the motor means is employed to supplement the forces provided by the torsion bars and springs in the beds. Alternatively, the entire force for moving the cover sections between their collapsed and extended positions may be supplied by the motor means.

In accordance with a further feature of the illustrated trailer, each of the forward and aft cover sections is provided with vents 440 and 442 that are in register with each other and with a further top vent 444 in the top of the refrigerator 34 so that this appliance, if gas operated, can operate when the cover sections are in their collapsed positions during towing. The vent 444 in the refrigerator top is closed by a flap 446 (shown open by the dotted lines in FIG. 4) held down by a button 448 or the like when the cover sections are extended. As the cover sections are collapsed, the roof of the aft cover section engages the button 448 to open the flap 446 and vent the refrigerator to ambient atmosphere.

A still further feature of the illustrated recreational vehicle includes a water faucet 560 associated with the sink 36 and which is rotatable and vertically adjustable, thereby permitting the faucet to be disposed above and outside the sink basin during use and to be lowered such that it will not interfere with nesting of the cover sections over the body sections. Further, such adjustable faucet permits the sink top to be at the same vertical level as other appliances. To this end, the depicted faucet 560 comprises a tubular member 562 that is slidably mounted in the sink top 564 as by an O-ring 566 for vertical and rotational (i.e., side-to-side) adjustment. The lower end 568 of the tubular member is fitted with a section of flexible hose 570 to accommodate such adjustments. For storage, the tubular member is pushed downwardly through the O-ring, causing a substantial portion thereof to be stored below the sink top. The tubular member is raised upwardly for use.

While a preferred embodiment has been shown and described, it will be understood that there is no intent to limit the invention by such disclosure, but rather, it is intended to cover all modifications and alternate constructions falling within the spirit and scope of the invention, as defined in the appended claims.

What is claimed:

1. A recreational vehicle convertible in size comprising:
   a body portion including a floor, end walls and side walls joined to and extending upwardly from said floor and joined together along their adjacent upright side edges to define a rigid open-top box-type structure, said body portion having a relatively low profile,
   a first cover section including roof means, and end wall and side walls joined to and depending from said roof means and joined together along their adjacent upright side edges to define a rigid open-bottom box-type structure having one open end, said first cover section being of a geometry and size that permits nesting of one end of said body portion therein,
   means mounting said first cover section for substantially arcuate movement of said first cover section between substantialy nesting and substantially non-nesting positions thereof relative to one end of said body section,
   a further cover section including roof means, and end wall and side walls joined to and depending from said roof means and joined together along their adjacent upright side edges to define a rigid open-bottom box-type structure having one open end, said further cover section being of a geometry and size that permits nesting of said body section and the open end of said first cover section therein,
   means mounted said further cover section for substantially arcuate movement of said further cover section between substantially nesting and substantially non-nesting positions thereof relative to said opposite end of said body sections, said open end of said further cover section overlapping said open end of said first cover section when said cover sections are in their substantially non-nesting position relative to said body section,
   a portion of each of said cover sections extending in cantilevered fashion from its respective end of said body section and having a portion of its open bottom exposed when said cover section is in its substantially non-nesting position relative to said body section,
   means movably disposed in closing relationship with each of said exposed open body portions of said cover sections,
   seal means interposed between said overlapping open ends of said cover sections, and
   means mounting said floor for movement over a supporting surface.

2. The recreational vehicle of claim 1 wherein each of said means removably closing one of said exposed bottom portions comprises a bed means.

3. The recreational vehicle of claim 1 and including torsion bar means connected with each of said means mounting said first cover section and said means mounting said further cover section and providing lift assistance in the movement of said cover sections toward their respective substantially non-nesting positions.

4. The recreational vehicle of claim 3 wherein said spring means comprises a helical tension member having one of its ends anchored to the outboard side of said bed means and having its opposite end floating, pulley means mounted on said floating end, and flexible strand means trained about sid pulley means, one end of said strand means being anchored to the inboard side of said bed means and the opposite end thereof being anchored to that end wall of said body portion adjacent said bed means whereby inward movement of said bed means functions to tension said helical tension member.

5. The recreational vehicle of claim 3 and including spring means disposed adjacent the end of one of said body sections in position to exert a generally horizontal force against the end wall of said cover section over a substantial portion of the path of movement of such cover section toward its substantially non-nesting position relative to said body section.

6. The recreational vehicle of claim 1 and including refrigerator means having a vent, disposed within said body section and vent means disposed in said roof of each of said cover sections, the location of said vent means in each roof being such that said vent means register with said vent of said refrigerator means upon movement of said cover sections to their substantially nesting position.

7. The recreational vehicle of claim 6 and including flap means mounted on said vent of said refrigerator means movable between open and closed positions with respect to said vent means and means biasing said vent means toward its open position, and latch means releasably holding said flap means in its closed position and operated by movement of one of said cover sections to release said flap means for opening thereof.

8. The recreational vehicle of claim 1 wherein said means removably disposed in closing relationship with each of said exposed open bottom portions of said cover sections comprise first and further beds, each of said beds defining first and further grooves in the bottom thereof, a plurality of elongated supports operatively associated with each of said beds, each of said supports being hingedly mounted at one end of said body sections and engaging one of said grooves at its opposite end whereby said end of each of said supports engaging said groove follows said groove upon movement of said bed out from its storage position thereby swinging said support out for a supporting said bed.

9. The recreational vehicle of claim 1 wherein said means mounting each of said cover sections for arcuate movement comprises a first pivoting arm disposed on one side of said cover section, and a further pivoting arm disposed on the opposite side of each of said cover section, each of said pivoting arms including one end rotatably secured to said cover section, torsion bar means connected to the opposite end of each of said pivoting arms, said torsion bar means mounted on said body section and extending transversely of said floor of said body section whereby said torsion bar means impart lift and arcuate motion assistance to each of said first and further cover sections, respectively, in the direction of their movement toward substantially non-nesting positions.

* * * * *